(12) United States Patent
Aoyama et al.

(10) Patent No.: US 9,540,530 B2
(45) Date of Patent: Jan. 10, 2017

(54) WATER-BASED INK FOR INK-JET RECORDING, INK CARTRIDGE AND INK-JET RECORDING APPARATUS

(71) Applicants: Michiko Aoyama, Nagoya (JP); Mitsunori Maeda, Nagoya (JP)

(72) Inventors: Michiko Aoyama, Nagoya (JP); Mitsunori Maeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 268 days.

(21) Appl. No.: 14/228,458

(22) Filed: Mar. 28, 2014

(65) Prior Publication Data

US 2014/0292904 A1 Oct. 2, 2014

(30) Foreign Application Priority Data

Mar. 29, 2013 (JP) .................. 2013-074462

(51) Int. Cl.
*B41J 2/21* (2006.01)
*C09D 11/38* (2014.01)
(Continued)

(52) U.S. Cl.
CPC .............. *C09D 11/38* (2013.01); *B41J 2/01* (2013.01); *B41J 2/2107* (2013.01); *C09D 11/322* (2013.01)

(58) Field of Classification Search
CPC ............. B41J 2/01; B41J 2/0057; B41J 2/05; B41J 2/1433; B41J 2/17; B41J 2/1755; B41J 2/17503; B41J 2/17593; B41J 2/21; B41J 2/211; B41J 2/2107; B41J 2/2114; B41J 2/2117; B41J 2/2056; B41J 11/0015; B41J 11/002; B41J 3/60; B41M 5/0011; B41M 5/0017; B41M 5/52; B41M 5/5218; B41M 7/00; B41M 7/0072; B41M 7/0081; B41M 7/009; C09D 11/005; C09D 11/30; C09D 11/32; C09D 11/322; C09D 11/328; C09D 11/36; C09D 11/38; C09D 11/40; C09D 11/52; C09D 11/54; C09D 11/101; C09D 17/007; C09D 17/008
(Continued)

(56) References Cited

U.S. PATENT DOCUMENTS 5,609,671 A   3/1997   Nagasawa
5,837,045 A   11/1998  Johnson et al.
(Continued)

FOREIGN PATENT DOCUMENTS

JP   H08-3498 A      1/1996
JP   2000-513396 A   10/2000
(Continued)

OTHER PUBLICATIONS

Nov. 9, 2016—(JP) Notice of Reasons for Rejection—App 2013074462—partial Eng Tran.

*Primary Examiner* — Manish S Shah
(74) *Attorney, Agent, or Firm* — Banner & Witcoff, Ltd.

(57) ABSTRACT

A water-based ink for ink-jet recording includes: a pigment; water; 1,2-alkanediol; and a surfactant represented by the following general formula (1): $R^1CON(CH_3)CH_2CH_2R^2$, wherein in the general formula (1), $R^1$ is a saturated or unsaturated hydrocarbon group having 9 to 19 carbon atoms; the hydrocarbon group is straight chain or branched chain hydrocarbon group; $R^2$ is $SO_3M$ or COOM; and M is Li, Na or K.

18 Claims, 3 Drawing Sheets

(51) Int. Cl.
*B41J 2/01* (2006.01)
*C09D 11/322* (2014.01)

(58) Field of Classification Search
USPC ... 347/9–22, 56, 86, 88, 95–105; 106/31.13, 106/31.27, 31.6, 31.85, 31.77; 523/160, 523/161
See application file for complete search history.

(56) References Cited

U.S. PATENT DOCUMENTS

| | | | |
|---|---|---|---|
| 6,352,340 B1* | 3/2002 | Erdtmann | C09D 11/38 347/100 |
| 7,922,805 B2 | 4/2011 | Kowalski et al. | |
| 8,016,404 B2 | 9/2011 | Kato et al. | |
| 2003/0097960 A1 | 5/2003 | Ito et al. | |
| 2005/0139124 A1 | 6/2005 | Ito et al. | |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2007/0282033 A1 | 12/2007 | Ito et al. | |
| 2008/0207805 A1* | 8/2008 | Blease | C09D 11/40 524/145 |
| 2008/0241398 A1 | 10/2008 | Kato et al. | |
| 2009/0169761 A1 | 7/2009 | Szajewski et al. | |
| 2009/0169762 A1* | 7/2009 | Szajewski | C09D 11/38 427/466 |

FOREIGN PATENT DOCUMENTS

| | | |
|---|---|---|
| JP | 2003-026972 A | 1/2003 |
| JP | 2003107701 A | 4/2003 |
| JP | 2003-286427 A | 10/2003 |
| JP | 2004059614 A | 2/2004 |
| JP | 2008-524400 A | 7/2008 |
| JP | 2008-246821 A | 10/2008 |
| JP | 2009-515007 A | 4/2009 |
| JP | 2011-510108 A | 3/2011 |
| JP | 4764562 B2 | 9/2011 |
| JP | 4764563 B2 | 9/2011 |

* cited by examiner

WATER-BASED INK FOR INK-JET RECORDING, INK CARTRIDGE AND INK-JET RECORDING APPARATUS

CROSS REFERENCE TO RELATED APPLICATION

The present application claims priority from Japanese Patent Application No. 2013-074462 filed on Mar. 29, 2013, the disclosure of which is incorporated herein by reference in its entirety.

BACKGROUND OF THE INVENTION

Field of the Invention

The present invention relates to a water-based ink for ink-jet recording, an ink cartridge and an ink-jet recording apparatus.

Description of the Related Art

There is proposed a water-based ink for ink-jet recording using a pigment (hereinafter referred to as a "water-based pigment ink" in some cases) wherein a predetermined amount of 1,2-alkanediol is added so as to realize a stable discharge (see Japanese Patent No. 4764562 corresponding to United States Patent Application Publication Nos. 2005/0139124 and 2003/0097960 and Japanese Patent No. 4764563 corresponding to United States Patent Application Publication Nos. 2005/0139124, 2003/0097960 and 2007/0282033).

However, when the 1,2-alkanediol is added to the water-based pigment ink, the re-dispersion property is lowered. In view of this, it is considered to add a surfactant to the water-based pigment ink so as to improve the re-dispersion property. Depending on the kind of surfactant, however, there is such a problem that the chromaticness of a recorded matter is lowered.

An object of the present teaching is to provide a water-based ink for ink-jet recording which uses a pigment and which is capable of improving the re-dispersion property without lowering the chromaticness of the recorded matter.

SUMMARY OF THE INVENTION

According to a first aspect of the present teaching, there is provided a water-based ink for ink-jet recording including: a pigment; water; 1,2-alkanediol; and a surfactant represented by the following general formula (1):

$$R^1CON(CH_3)CH_2CH_2R^2 \quad (1)$$

wherein in the general formula (1), $R^1$ is a saturated or unsaturated hydrocarbon group having 9 to 19 carbon atoms; the hydrocarbon group is a straight-chain or branched-chain hydrocarbon group; $R^2$ is $SO_3M$ or $COOM$; and M is Li, Na or K.

According to a second aspect of the present teaching, there is provided an ink cartridge including the water-based ink for ink-jet recording of the first aspect.

According to a third aspect of the present teaching, there is provided an ink-jet recording apparatus including: the water-based ink for ink-jet recording of the first aspect; an ink accommodating section configured to accommodate the water-based ink for ink-jet recording of the first aspect; and an ink discharging mechanism configured to discharge the water-based ink accommodated in the ink accommodating section.

DESCRIPTION OF THE PREFERRED EMBODIMENTS

Figure 1:
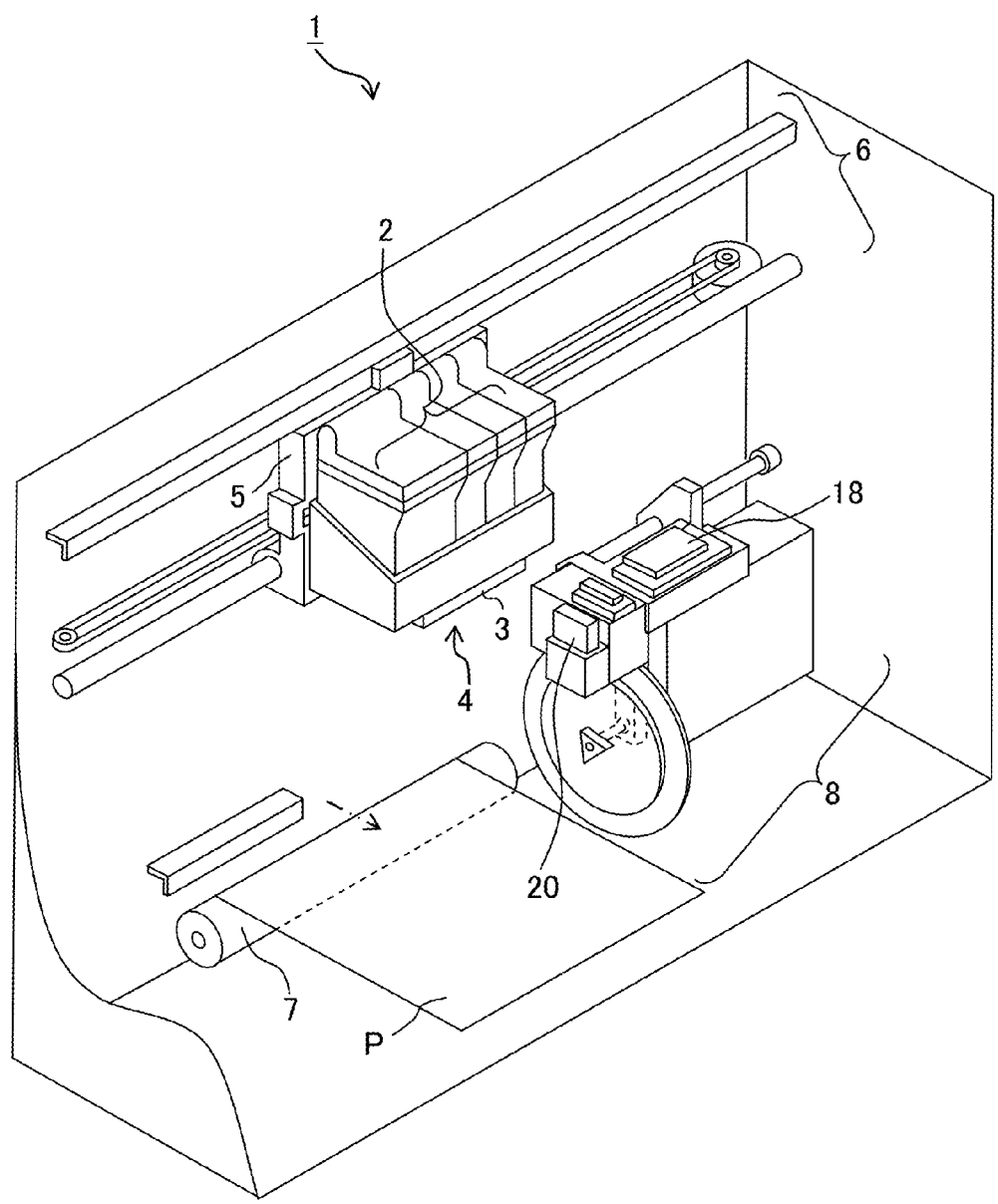
FIG. 1 is a schematic perspective view showing an example of the configuration of an ink-jet recording apparatus of the present teaching.

In the present teaching, the term "re-dispersion property of the water-based ink for ink-jet recording (hereinafter referred to as a "water-based ink" or an "ink" in some cases)" means, for example, solubility and dispersion property of a solid matter, in a water-based ink, generated after the water-based ink is once evaporated to dryness with resultant solid matter, the solubility and dispersion property being those of when the solid matter is then newly brought into contact with the water-based ink. The re-dispersion property of the water-based ink can be measured, for example, by a method explained in Examples which will be described later on.

An explanation will be made about the water-based ink of the present teaching. The water-based ink of the present teaching includes a colorant and water.

In the present teaching, the pigment is not particularly limited and includes, for example, carbon black, an inorganic pigment, an organic pigment, etc. The carbon black includes, for example, furnace black, lamp black, acetylene black, channel black, etc. The inorganic pigment includes, for example, titanium oxide, inorganic pigments based on iron oxide, inorganic pigments based on carbon black, etc. The organic pigment includes, for example, azo-pigments such as azo lake, insoluble azo-pigment, condensed azo-pigment, chelate azo-pigment, etc.; polycyclic pigments such as phthalocyanine pigment, perylene and perynon pigments, anthraquinone pigment, quinacridone pigment, dioxadine pigment, thioindigo pigment, isoindolinone pigment, quinophthalone pigment etc.; dye lake pigments such as basic dye type lake pigment, acid dye type lake pigment etc.; nitro pigments; nitroso pigments; aniline black daylight fluorescent pigment; and the like. Any other pigment is also usable provided that the pigment is dispersible in a water phase (aqueous phase). Specific example of the pigments as described above include, for example, C. I. Pigment Blacks 1, 6, and 7; C. I. Pigment Yellows 1, 2, 3, 12, 13, 14, 15, 16, 17, 55, 73, 74, 75, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; C. I. Pigment Greens 7 and 36; and the like.

The pigment may be a self-dispersible pigment. The self-dispersible pigment is dispersible in water without using any dispersant, for example, owing to the fact that at least one of the hydrophilic functional group and the salt thereof including, for example, carbonyl group, hydroxyl group, carboxylic acid group, sulfonic acid group (sulfonate group), phosphoric acid group (phosphate group), etc. is introduced into the surfaces of the pigment particles by the chemical bond directly or with any group intervening therebetween. As the self-dispersible pigment, it is possible to use a self-dispersible pigment subjected to the surface treatment by any one of methods described, for example, in Japanese Patent Application Laid-open No. 8-3498 corresponding to U.S. Pat. No. 5,609,671, Published Japanese Translation of PCT International Publication for Patent Application No. 2000-513396 corresponding to U.S. Pat. No. 5,837,045, Published Japanese Translation of PCT International Publication for Patent Application No. 2008-524400 corresponding to United States Patent Application Publication No. 2006/0201380, Published Japanese Translation of PCT International Publication for Patent Application No. 2009-515007 corresponding to United States Patent Application Publication Nos. 2007/0100023 and 2007/0100024, etc. It is possible to use, as a material for the self-dispersible pigment, either one of the inorganic pigment and the organic pigment. Further, a pigment which is suitable for the above-described treatment includes, for example, carbon black such as "MA8" and "MA100" produced by Mitsubishi Chemical Corporation, etc. As the self-dispersible pigment, it is possible, for example, to use a commercially available product. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by Cabot Corporation; "BONJET (trade name) BLACK CW-2" and "BONJET (trade name) BLACK CW-3" produced by Orient Chemical Industries, Ltd.; "LIOJET (trade name) WD BLACK 002C" produced by TOYO INK SC HOLDINGS CO., LTD.; and the like.

The water-based ink of the present teaching is a water-based ink capable of improving the re-dispersion property, without lowering the chromaticness of a recorded matter. Accordingly, the present teaching is particularly effective for a water-based ink using a chromatic color pigment required to have a high chromaticness. The term "chromatic color pigment" means a pigment that is different from pigments of white, black and gray colors that are achromatic colors, and is exemplified, for example, by yellow, magenta and cyan pigments. One type (kind) of these pigments may be used singly, or two or more types (kinds) of these pigments may be used in a mixed manner.

The solid content blending amount of the pigment (pigment solid content) with respect to the entire amount of the water-based ink is not particularly limited, and may be appropriately determined based on, for example, desired optical density or color (hue, tint), etc. The pigment solid content is, for example, in a range of 0.1% by weight to 20% by weight, is preferably in a range of 1% by weight to 15% by weight, and is more preferably in a range of 2% by weight to 10% by weight.

The water-based ink may include a colorant that is different from the pigment, in addition to the above-described pigment. The colorant other than the pigment includes, for example, a dye, etc. Further, it is allowable that the water-based ink does not contain any other colorant that is different from the pigment. Generally, the chromaticness of a water-based ink using a pigment tends to be lower than the chromaticness of a water-based ink using a dye. Since the present teaching is capable of improving re-dispersion property without lowering the chromaticness of a recorded matter, the present teaching is particularly effective for a water-based ink containing substantially only the pigment, as the colorant, for example, such a water-based ink wherein the pigment is contained in the colorant in an amount within a range of 90% by weight to 100% by weight.

It is preferable that the water is ion exchange water or pure water (purified water). The blending amount of water (water ratio) with respect to the entire amount of the water-based ink is, for example, in a range of 10% by weight to 90% by weight; the water ratio is preferably in a range of 40% by weight to 80% by weight in view of preparing the ink. The water ratio may be, for example, the balance of the other components.

As described above, the water-based ink further contains the 1,2-alkanediol and the surfactant represented by the general formula (1). In a case that the 1,2-alkanediol is added to a water-based pigment ink, the chromaticness of the recorded matter is improved. The mechanism for improving the chromaticness of the recorded matter is presumed as follows. Namely, in the 1,2-alkanediol, two hydroxyl groups as the hydrophilic groups are positioned at end portion of the main chain (positions of the 1 and 2), and thus the 1,2-alkanediol has a surface active action. Due to the surface active action, the water-based ink permeates into a recording medium, thereby satisfactorily coloring the recording medium. It is presumed that as a result of the above, the chromaticness of the recorded matter is improved.

However, although the 1,2-alkanediol improves the chromaticness of the recorded matter, there is a fear that the 1,2-alkanediol might lower the re-dispersion property of the water-based ink. The water-based pigment ink of the present teaching uses the 1,2-alkanediol together with the surfactant represented by the general formula (1) to thereby make it possible to improve the re-dispersion property without lowering the chromaticness. The mechanism of improving the re-dispersion property is presumed, for example, as follows. Namely, in the surfactant represented by the general formula (1), the nitrogen atom (N) in the molecule is positively charged (+) by being bonded to the acyl group, and $SO_3$ or COO in $R^2$ is negatively charged (−). It is considered that, due to the interaction between the positive and negative charges and the functional groups on the surface of the self-dispersible pigment, the mutual dispersion state of the pigment particles is satisfactorily maintained. Further, it is presumed that, owing to the presence of the methyl group bonded to N in the molecule of the surfactant represented by the general formula (1), the distance between the pigment particles and the surfactant represented by the general formula (1) is appropriately maintained. This is also considered as contributing to the re-dispersion property. Note that, however, this mechanism is presumption and thus is not intended to limit or restrict the present teaching in any manner.

Although the 1,2-alkanediol may be a straight-chain alkanediol or a branched-chain alkanediol, the 1,2-alkanediol is preferably a straight-chain alkanediol. Further, in a case that the number of carbon atoms in the 1,2-alkanediol is not more than 6, the solubility to the water becomes high. Accordingly, the number of carbon atoms in the 1,2-alkanediol is preferably in a range of 2 to 6. Examples of the 1,2-alkanediol include, for example, 1,2-ethanediol (1,2 EDL), 1,2-propanediol (1,2 PrDL), 1,2-butanediol (1,2 BDL), 1,2-pentanediol (1,2PeDL), 1,2-hexanediol (1,2HDL), etc. Among those described above, 1,2-hexanediol and 1,2-pentanediol are preferable, and 1,2-hexanediol is particularly preferable. One type (kind) of the 1,2-alkanediol may be singly used, or two or more kinds (types) of the 1,2-alkanediol may be used in combination.

Examples of the surfactant represented by the general formula (1) include, for example, methyltaurate, alaninate, etc. As the surfactant represented by the general formula (1), it is possible, for example, to use a commercially available product. The commercially available product includes, for example, "LIPOTAC (trade name) TE" and "ENAGICOL (trade name) L-30AN" produced by Lion Corporation, etc. With respect to the surfactant represented by the general formula (1), it is preferable that, in the general formula (1), $R^1$ is a hydrocarbon group having 15 to 17 carbon atoms, $R^2$ is $SO_3M$ and M is Na. A commercially available product of surfactant having such a chemical structure is exemplified by the above-described "LIPOTAC (trade name) TE" produced by Lion Corporation. Further, it is preferable that, in the general formula (1), $R^1$ is a hydrocarbon group having 11 carbon atoms, $R^2$ is COOM and M is Na. A commercially available product of surfactant having such a chemical structure is exemplified by the above-described "ENAGICOL (trade name) L-30AN" produced by Lion Corporation. One type (kind) of the surfactant represented by the general formula (1) may be singly used, or two or more types (kinds) of the surfactant represented by the general formula (1) may be used in combination.

The water-based ink of the present teaching may further contain another surfactant which is different from the surfactant represented by the general formula (1), in addition to the surfactant represented by the general formula (1), in a range achieving the effect of the present teaching, or may not contain such another surfactant. The water-based ink of the present teaching preferably contains the surfactant represented by the general formula (1) in such a manner that the content amount (ratio) of the surfactant represented by the general formula (1) with respect to the total (entire) amount of the surfactants contained in the water-based ink is in a range of 50% by weight to 100% by weight, preferably in a range of 90% by weight to 100% by weight.

It is preferable that the 1,2-alkanediol and the surfactant represented by the general formula (1) are blended in the water-based ink so as to satisfy the following conditions (A) to (C). Further, it is more preferable that at least one of 1,2-hexanediol and 1,2-pentanediol is used as the 1,2-alkanediol, and that the 1,2-alkanediol and the surfactant represented by the general formula (1) are blended in the water-based ink so as to satisfy the following conditions (D) to (F):

$5 \leq x \leq 30$ (A)

$0 \leq y \leq 1$ (B)

$y \geq -0.05x + 0.75$ (C)

$5 \leq x \leq 25$ (D)

$0.3 \leq y \leq 1$ (E)

$y \geq -0.05x + 1.25$ (F)

wherein in the conditions (A) to (F), x is blending amount (% by weight) of the 1,2-alkanediol with respect to the entire amount of the water-based ink; and y is blending amount (% by weight) of the surfactant represented by the general formula (1) with respect to the entire amount of the water-based ink.

It is allowable that the water-based ink further contains a water-soluble organic solvent that is different from the 1,2-alkanediol. The water-soluble organic solvent is exemplified, for example, by a humectant which prevents the water-based ink from being dried at an end portion (forward end portion) of a nozzle of an ink-jet head and a penetrant which adjusts the drying velocity on a recording medium.

The humectant is not particularly limited, and includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyhydric alcohols such as alkylene glycol, glycerol and trimethylolpropane; 2-pyrrolidone; N-methyl-2-pyrrolidone; and 1,3-dimethyl-2-imidazolidinone. The polyalkylene glycol includes, for example, polyethylene glycol, polypropylene glycol, etc. The alkylene glycol includes, for example, diethylene glycol, triethylene glycol, dipropylene glycol, tripropylene glycol, thiodiglycol, hexylene glycol, etc. One type (kind) of the humectant as described above may be used singly, or two or more types (kinds) of the humectants as described above may be used in combination. Among them, it is preferable to use polyhydric alcohol such as alkylene glycol, glycerol, etc.

The blending amount of the humectant with respect to the entire amount of the water-based ink is, for example, in a range of 0% by weight to 95% by weight, is preferably in a range of 5% by weight to 80% by weight, and is more preferably in a range of 5% by weight to 50% by weight.

The penetrant is not limited, and includes, for example, glycol ether. The glycol ether is not limited, and includes, for example, ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One type (kind) of the penetrant may be used singly, or two or more types (kinds) of the penetrants may be used in combination.

The blending amount of the penetrant with respect to the entire amount of the water-based ink is, for example, in a range of 0% by weight to 20% by weight, is preferably in a range of 0.1% by weight to 15% by weight, is more preferably in a range of 0.5% by weight to 10% by weight.

The water-based ink may further contain a conventionally known additive, as necessary. The additive includes, for example, surfactants other than the surfactant represented by the general formula (1), pH-adjusting agents, viscosity-adjusting agents, surface tension-adjusting agents, fungicides, etc. The viscosity-adjusting agents include, for example, polyvinyl alcohol, cellulose, water-soluble resin, etc.

The water-based ink can be prepared, for example, such that the pigment, water, the 1,2-alkanediol, the surfactant represented by the general formula (1), and optionally other additive component(s) are mixed uniformly or homogeneously by any conventionally known method, and undissolved matters are removed by a filter or the like.

As explained above, according to the present teaching, it is possible to improve the re-dispersion property, without lowering the chromaticness of a recorded matter, by using the 1,2-alkanediol together with the surfactant represented by the general formula (1) in the water-based pigment ink.

Next, an explanation will be given about an ink cartridge of the present teaching. The ink cartridge of the present teaching is characterized by being an ink cartridge containing a water-based ink for ink-jet recording; wherein the water-based ink is the water-based ink for ink-jet recording of the present teaching. For example, any conventionally known main body (body) of an ink cartridge can be used for the main body of the ink cartridge of the present teaching.

Next, explanation will be given about an ink-jet recording apparatus and an ink-jet recording method of the present teaching.

The ink-jet recording apparatus of the present teaching is an ink-jet recording apparatus characterized by including: an ink accommodating section which accommodates an ink therein; and an ink discharge mechanism which discharges the ink accommodated in the ink accommodating section; wherein the ink accommodated in the ink accommodating section is the water-based ink of the present teaching.

The ink-jet recording method of the present teaching is an ink-jet recording method characterized by including: performing recording on a recording medium by discharging, to the recording medium, a water-based ink by an ink-jet system; and using the water-based ink for ink-jet recording of the present teaching, as the water-based ink.

The ink-jet recording method of the present teaching can be practiced, for example, by using the ink-jet recording apparatus of the present teaching. The recording includes printing a letter (text), printing an image, printing, etc.

FIG. 1 shows the configuration of an example of the ink-jet recording apparatus of the present teaching. As shown in FIG. 1, an ink-jet recording apparatus 1 of the present teaching includes four ink cartridges 2, an ink discharge mechanism (ink-jet head) 3, a head unit 4, a carriage 5, a driving unit 6, a platen roller 7 and a purge device 8 as main constitutive components or parts.

The four ink cartridges 2 contain four colors of water-based inks, respectively, the four colors being yellow, magenta, cyan and black. For example, each of the water-based yellow ink, water-based magenta ink and water-based cyan ink is the water-based ink for ink-jet recording of the present teaching. It is allowable to use a general water-based black ink as the water-based black ink. The ink-jet head 3 disposed on the head unit 4 performs recording on a recording medium (for example, recording paper or recording sheet) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398). The platen roller 7 extends in the reciprocating direction of the carriage 5 and is arranged to face or be opposite to the ink-jet head 3.

The purge device 8 sucks or draws unsatisfactory ink (poor ink) which contains air bubbles, etc. accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 1, a cap 18 is provided to cover a plurality of nozzles of the ink-jet head 3 which is returned to a reset position upon completion of the recording, so as to prevent the water-based inks from drying.

In the ink-jet recording apparatus 1 of the present embodiment, the four ink cartridges 2 are provided, together with the head unit 4, on one carriage 5. However, the present teaching is not limited to this. In the ink-jet recording apparatus, the respective four cartridges 2 may be provided on a carriage which is different (separate) from the carriage on which the head unit 4 is provided. Alternatively, the respective four cartridges 2 may be arranged and fixed inside the ink-jet recording apparatus, rather than being provided on the carriage 5. In such aspects, for example, each of the four cartridges 2 and the head unit 4 which is provided on the carriage 5 are connected with a tube, etc., and the water-based ink are supplied from the four cartridges 2, respectively, to the head unit 4 via the tubes.

Ink-jet recording using the ink-jet recording apparatus 1 is performed, for example, in the following manner. Namely, at first, a recording paper P is supplied or fed, for example, from a paper feeding cassette or sheet feeding cassette (not shown) arranged at a side of or at a position below the ink-jet recording apparatus 1. The recording paper P is introduced or guided between the ink-jet head 3 and the platen roller 7. Then, a predetermined recording is performed on the fed or introduced recording paper P with the water-based ink(s) discharged or jetted from the ink-jet head 3. Since the water-based ink of the present teaching is excellent in the re-dispersion property, the water-based ink of the present teaching is capable of realizing stable ink discharge from the ink-jet head 3. The recording paper P after the recording is discharged from the ink-jet recording apparatus 1. According to the water-based ink of the present teaching, it is possible to obtain a recorded matter that is excellent in the chromaticness. In FIG. 1, the paper feeding mechanism and paper discharge mechanism for the recording paper P are omitted in the drawing.

In the apparatus shown in FIG. 1, an ink-jet head of serial type (serial type ink-jet head) is adopted. However, the present teaching is not limited to this. The ink-jet recording apparatus may be an apparatus adopting an ink-jet head of line type (line type ink-jet head).

EXAMPLES

Next, examples of the present teaching will be explained together with comparative examples. Note that the present teaching is not limited and not restricted to the examples and the comparative examples which will be described below.

Examples 1 to 21 and Comparative Examples 1 to 11

Components, except for a self-dispersible pigment, which were included in Composition of Water-based Ink (TABLE 2 or TABLE 3 as indicated below) were mixed uniformly or homogeneously; and thus an ink solvent was obtained. Subsequently, the ink solvent was added to the self-dispersible pigment dispersed in water, followed by being mixed uniformly. After that, the obtained mixture was filtrated through a cellulose acetate membrane filter (pore size 3.00 μm) produced by Toyo Roshi Kaisha, Ltd., and thus a water-based ink for ink-jet recording of each of Examples 1 to 21 and Comparative Examples 1 to 11 was obtained.

With respect to the water-based inks of Examples 1 to 21 and Comparative Examples 1 to 11, (a) chromaticness evaluation, (b) re-dispersion property evaluation, and (c) overall evaluation were performed by the following methods.

(a) Chromaticness Evaluation

The water-based inks of Examples 1-21 and Comparative Examples 1-11 were each coated on a plain paper (plain paper sheet; "Hammer Mill Laser Print 241b" produced by International Paper Company), in an area of approximately 5 cm (horizontal)×approximately 10 cm (vertical) and at an ratio of approximately 20 g/m² with a bar coater, and then was dried; and evaluation samples were prepared. The chromaticness (C*) of each of the evaluation samples was measured by using a spectrophotometric colorimetry meter SpectroEye (light source: $D_{50}$, field: 2°, density: ANSI T) produced by X-Rite Inc., and evaluations were made for the evaluation samples based on the following evaluation criterion. The Evaluation criterion of chromaticness evaluation is shown in TABLE 1 as follows.

<Evaluation Criterion of Chromaticness Evaluation>

TABLE 1

| Evaluation criterion | Water-based magenta ink | Water-based yellow ink | Water-based cyan ink |
|---|---|---|---|
| AA: | Chromaticness (C*) is not less than 61 | — | — |
| A: | Chromaticness (C*) is not less than 60 and less than 61 | Chromaticness (C*) is not less than 78 | Chromaticness (C*) is not less than 54 |
| B: | Chromaticness (C*) is less than 60 | Chromaticness (C*) is less than 78 | Chromaticness (C*) is less than 54 |

(b) Evaluation of Re-Dispersion Property

The water-based inks of Examples 1-21 and Comparative Examples 1-11 were each dripped in amount of 10 μL onto glass slides, respectively. Subsequently, the glass slides were stored for duration of one day under an environment of temperature: 60 degrees Celsius and relative humidity: 40%, and thus the water-based inks were evaporated and dried. Next, 1 mL of pure or purified water was dripped onto each of solid matters after the storage, and evaluations samples were prepared. With respect to the evaluation samples prepared in such a manner, presence or absence of any coarse particles and foreign matters was observed visually and by using a microscope (magnification: ×200); and the re-dispersion property was evaluated for each of the evaluation samples based on the following evaluation criterion.

<Evaluation Criterion for Re-Dispersion Property>

AA: The solid matter was promptly re-dispersed (dissolved and dispersed in pure water) upon dripping of pure water, and any coarse particles and foreign matter were not observed visually and also microscopically.

A: The solid matter was re-dispersed promptly upon dripping of pure water, and any coarse particles and foreign matter were not observed visually, but coarse particles and foreign matter were observed microscopically.

B: Coarse particles and foreign matter were observed visually.

C: The ink did not re-disperse at all.

(c) Overall evaluation

In relation to each of the inks of Examples 1-21 and Comparative Examples 1-11, the overall evaluation was performed in accordance with the following evaluation criteria on the basis of the results of (a) and (b) described above.

<Evaluation Criteria for Overall Evaluation>

G: "AA" or "A" was present in both of the evaluations (a) and (b).

NG: "B" or "C" was present in both or either one of the evaluations (a) and (b), or the water-based ink could not be prepared and the evaluations (a) and (b) could not be performed.

Figure 2:
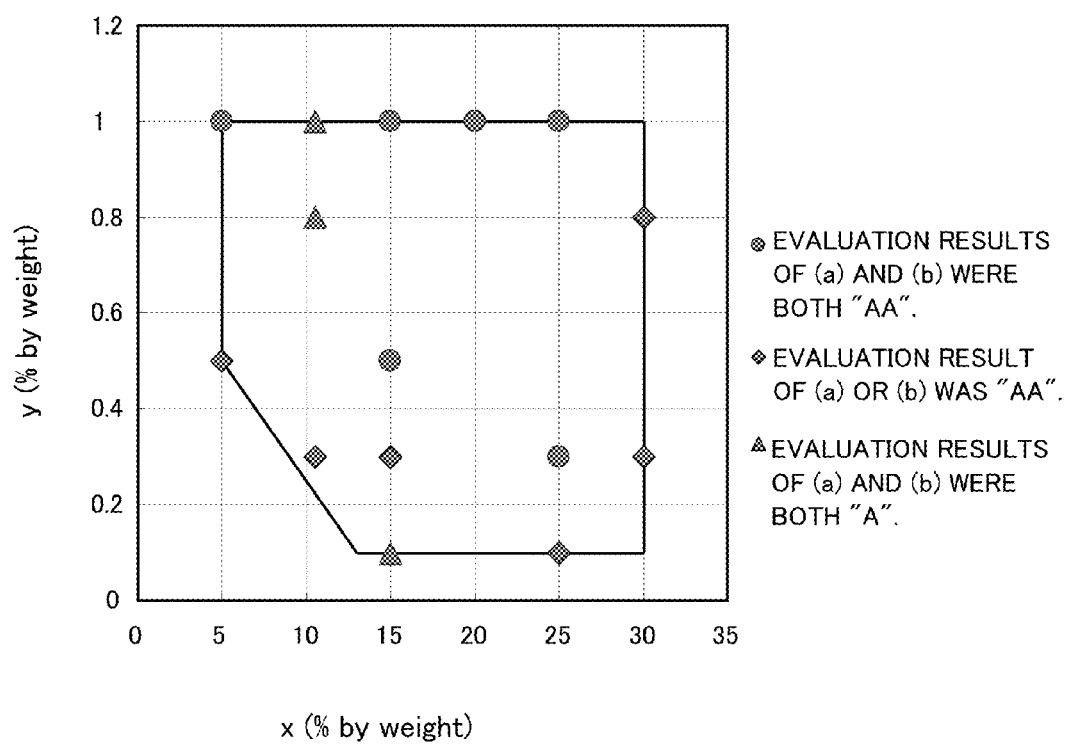
FIG. 2 is a graph showing the relationship between the compositions of water-based inks of Examples 1 to 21 and evaluation results for the respective water-based inks.
Figure 3:
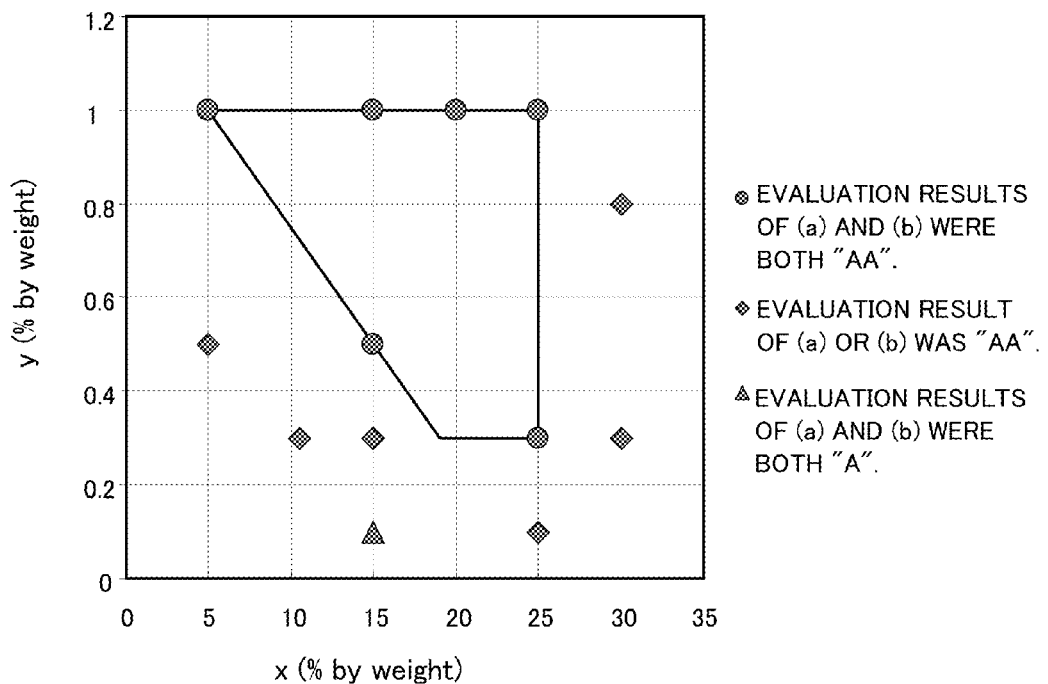
FIG. 3 is a graph showing the relationship between the compositions of water-based inks of Examples 1-5, 9-18 and 21 and evaluation results for the respective water-based inks.

The water-based ink compositions and the evaluation results of Examples 1 to 21 are shown in TABLE 2. Further, the water-based ink compositions and the evaluation results of Comparative Examples 1 to 11 are shown in TABLE 3. Further, FIG. 2 shows a graph in which the horizontal axis (x) is the blending amount (% by weight) of the 1,2-alkanediol with respect to the entire amount of the water-based ink and the vertical axis (y) is the blending amount (% by weight) of the surfactant represented by the general formula (1) with respect to the entire amount of the water-based ink; in the graph of FIG. 2, the following marks of ○ (circle), ◇ (diamond) and Δ (triangle) based on the evaluation results of the water-based inks of Examples 1 to 21 are plotted at positions showing the compositions of the water-based inks of Examples 1 to 21, respectively. FIG. 2 also shows a range in which the 1,2-alkanediol and the surfactant represented by the general formula (1) satisfy the above-described conditions (A) to (C). Furthermore, FIG. 3 shows a graph in which the horizontal axis (x) is the blending amount (% by weight) of the 1,2-alkanediol with respect to the entire amount of the water-based ink and the vertical axis (y) is the blending amount (% by weight) of the surfactant represented by the general formula (1) with respect to the entire amount of the water-based ink; in the graph of FIG. 3, the following marks of ○ (circle), ◇ (diamond) and Δ (triangle) based on the evaluation results of the respective water-based inks of Examples 1-5, 9-18 and 21 are plotted at positions showing the compositions of the water-based inks of Examples 1-5, 9-18 and 21, respectively. Each of the water-based ink of each of Examples 1-5, 9-18 and 21 used 1,2-hexandiol or 1,2-pendanediol as the 1,2-alkanediol. FIG. 3 also shows a range in which the 1,2-alkanediol and the surfactant represented by the general formula (1) satisfy the above-described conditions (D) to (F).

[Marks in FIGS. 2 and 3]

○ (circle): Evaluation results of (a) and (b) were both "AA".

◇ (diamond): Evaluation result of (a) or (b) was "AA".

Δ (triangle): Evaluation results of (a) and (b) were both "A".

TABLE 2

|  |  | EXAMPLES | | | | | |
| --- | --- | --- | --- | --- | --- | --- | --- |
|  |  | EX. 1 | EX. 2 | EX. 3 | EX. 4 | EX. 5 | EX. 6 |
| Composition of Water-based Ink (% by weight) | CAB-O-JET (trade name) 465M (*1) | 5.2 | 5.2 | 5.2 | 5.2 | 5.2 | 5.2 |
|  | CAB-O-JET (trade name) 470Y (*2) | — | — | — | — | — | — |
|  | CAB-O-JET (trade name) 450C (*3) | — | — | — | — | — | — |
|  | Glycerol | 20 | 20 | 20 | 18 | 20 | 20 |
|  | 1,2 HDL | 15 | 15 | 15 | 15 | — | — |
|  | 1,2 PeDL | — | — | — | — | 15 | — |
|  | 1,2 BDL | — | — | — | — | — | 15 |
|  | 1.2 PrDL | — | — | — | — | — | — |
|  | 1, 2 EDL | — | — | — | — | — | — |
|  | LIPOTAC (trade name) TE (*4) | 0.3 | — | 0.1 | 1 | 0.3 | 0.3 |
|  | ENAGICOL (trade name) L-30AN (*5) | — | 0.3 | — | — | — | — |
|  | Water | balance | balance | balance | balance | balance | balance |
| Evaluation | Chromaticness | A | A | A | AA | A | A |
|  | Re-dispersion property | AA | AA | A | AA | AA | AA |
|  | Overall Evaluation | G | G | G | G | G | G |

|  |  | EXAMPLES | | | | |
| --- | --- | --- | --- | --- | --- | --- |
|  |  | EX. 7 | EX. 8 | EX. 9 | EX. 10 | EX. 11 |
| Composition of Water-based Ink (% by weight) | CAB-O-JET (trade name) 465M (*1) | 5.2 | 5.2 | 5.2 | 5.2 | 5.2 |
|  | CAB-O-JET (trade name) 470Y (*2) | — | — | — | — | — |
|  | CAB-O-JET (trade name) 450C (*3) | — | — | — | — | — |
|  | Glycerol | 20 | 20 | 25 | 25 | 25 |
|  | 1,2 HDL | — | — | 5 | 5 | 10.5 |
|  | 1,2 PeDL | — | — | — | — | — |
|  | 1,2 BDL | — | — | — | — | — |
|  | 1.2 PrDL | 15 | — | — | — | — |
|  | 1, 2 EDL | — | 15 | — | — | — |
|  | LIPOTAC (trade name) TE (*4) | 0.3 | 0.3 | 0.5 | 1 | 0.3 |
|  | ENAGICOL (trade name) L-30AN (*5) | — | — | — | — | — |
|  | Water | balance | balance | balance | balance | balance |
| Evaluation | Chromaticness | A | A | A | AA | A |
|  | Re-dispersion property | AA | AA | AA | AA | AA |
|  | Overall Evaluation | G | G | G | G | G |

|  |  | EXAMPLES | | | | |
| --- | --- | --- | --- | --- | --- | --- |
|  |  | EX. 12 | EX. 13 | EX. 14 | EX. 15 | EX. 16 |
| Composition of Water-based Ink (% by weight) | CAB-O-JET (trade name) 465M (*1) | 5.2 | 5.2 | 5.2 | 5.2 | 5.2 |
|  | CAB-O-JET (trade name) 470Y (*2) | — | — | — | — | — |
|  | CAB-O-JET (trade name) 450C (*3) | — | — | — | — | — |
|  | Glycerol | 20 | 12 | 15 | 15 | 10 |
|  | 1,2 HDL | 15 | 20 | 25 | 25 | 25 |

TABLE 2-continued

|  |  |  |  |  |  |  |
|---|---|---|---|---|---|---|
|  | 1,2 PeDL | — | — | — | — | — |
|  | 1,2 BDL | — | — | — | — | — |
|  | 1.2 PrDL | — | — | — | — | — |
|  | 1, 2 EDL | — | — | — | — | — |
|  | LIPOTAC (trade name) TE (*4) | 0.5 | 1 | 0.1 | 0.3 | 1 |
|  | ENAGICOL (trade name) L-30AN (*5) | — | — | — | — | — |
|  | Water | balance | balance | balance | balance | balance |
| Evaluation | Chromaticness | AA | AA | AA | AA | AA |
|  | Re-dispersion property | AA | AA | AA | AA | AA |
|  | Overall Evaluation | G | G | G | G | G |

|  |  | EXAMPLES |  |  |  |  |
|---|---|---|---|---|---|---|
|  |  | EX. 17 | EX. 18 | EX. 19 | EX. 20 | EX. 21 |
| Composition of Water-based Ink (% by weight) | CAB-O-JET (trade name) 465M (*1) | 5.2 | 5.2 | — | — | 5.2 |
|  | CAB-O-JET (trade name) 470Y (*2) | — | — | 3.5 | — | — |
|  | CAB-O-JET (trade name) 450C (*3) | — | — | — | 3.5 | — |
|  | Glycerol | 10 | 10 | 30 | 30 | 20 |
|  | 1,2 HDL | 30 | 30 | — | — | 15 |
|  | 1,2 PeDL | — | — | — | — | — |
|  | 1,2 BDL | — | — | — | — | — |
|  | 1.2 PrDL | — | — | — | — | — |
|  | 1, 2 EDL | — | 10.5 | 10.5 | — | — |
|  | LIPOTAC (trade name) TE (*4) | 0.8 | 1 | 0.8 | 0.15 | — |
|  | ENAGICOL (trade name) L-30AN (*5) | — | 0.3 | — | — | 0.15 |
|  | Water | balance | balance | balance | balance | balance |
| Evaluation | Chromaticness | AA | AA | A | A | A |
|  | Re-dispersion property | A | A | A | A | AA |
|  | Overall Evaluation | G | G | G | G | G |

Note that in TABLE 2:
*1: Self-dispersible magenta pigment, produced by Cabot Corporation, numerals in the table indicate pigment solid content amounts.
*2: Self-dispersible yellow pigment, produced by Cabot Corporation, numerals in the table indicate pigment solid content amounts.
*3: Self-dispersible cyan pigment, produced by Cabot Corporation, numerals in the table indicate pigment solid content amounts.
*4: Surfactant represented by the general formula (1) (methyltaurate), produced by Lion Corporation, numerals in the table indicate active ingredient amounts.
*5: Surfactant represented by the general formula (1) (alaninate), produced by Lion Corporation, numerals in the table indicate active ingredient amounts.

TABLE 3

|  |  | COMPARATIVE EXAMPLES |  |  |  |  |  |  |  |  |  |  |
|---|---|---|---|---|---|---|---|---|---|---|---|---|
|  |  | COM. EX. 1 | COM. EX.2 | COM. EX. 3 | COM. EX. 4 | COM. EX. 5 | COM. EX. 6 | COM. EX. 7 | COM. EX8 | COM. EX. 9 | COM. EX. 10 | COM. EX.11 |
| Compostions of Water-based ink (% by weight) | CAB-O-JET (trade name) 465M (*1) | 5.2 | 5.2 | — | — | 5.2 | 5.2 | 5.2 | 5.2 | 5.2 | 5.2 | 5.2 |
|  | CAB-O-JET (trade name) 470Y (*2) | — | — | 3.5 | — | — | — | — | — | — | — | — |
|  | CAB-O-JET (tradename) 450C (*3) | — | — | — | 3.5 | — | — | — | — | — | — | — |
|  | Glycerol | 20 | 40 | 30 | 30 | 20 | 20 | 20 | 20 | 20 | 20 | 20 |
|  | 1,2 HDL | 15 | — | — | — | — | 15 | 15 | 15 | 15 | 15 | 15 |
|  | 1,2 EDL | — | — | 10.5 | 10.5 | — | — | — | — | — | — | — |
|  | 1,5-Pentanediol | — | — | — | — | 15 | — | — | — | — | — | — |

TABLE 3-continued

|  |  | COMPARATIVE EXAMPLES | | | | | | | | | | |
|---|---|---|---|---|---|---|---|---|---|---|---|---|
|  |  | COM. EX. 1 | COM. EX.2 | COM. EX. 3 | COM. EX. 4 | COM. EX. 5 | COM. EX. 6 | COM. EX. 7 | COM. EX8 | COM. EX. 9 | COM. EX. 10 | COM. EX.11 |
|  | LIPOTAC (trade name) TE (*4) | — | 0.3 | — | — | 0.3 | — | — | — | — | — | — |
|  | PELEX (trade name) NB-L (*6) | — | — | — | — | — | 0.3 | — | — | — | — | — |
|  | DEMOL (trade name) NL (*7) | — | — | — | — | — | — | 0.3 | — | — | — | — |
|  | EMULGEN (trade name) 150 (*8) | — | — | — | — | — | — | — | 0.3 | — | — | — |
|  | DK ESTER (trade name) F-160 (*9) | — | — | — | — | — | — | — | — | 0.3 | — | — |
|  | BYK-347 (*10) | — | — | — | — | — | — | — | — | — | 0.3 | — |
|  | BYK-348 (*11) | — | — | — | — | — | — | — | — | — | — | 0.3 |
|  | Water | balance | balance | balance | balance | balance | balance | balance | balance | balance | balance | balance |
| Evaluation | Chromaticness | A | (*12) | A | A | B | B | B | B | A | B | B |
|  | Re-dispersion property | B | | B | B | AA | B | B | B | C | B | B |
|  | Overall Evaluation | NG | NG | NG | NG | NG | NG | NG | NG | NG | NG | NG |

Note that in TABLE 3:
*1: Self-dispersible magenta pigment, produced by Cabot Corporation, numerals in the table indicate pigment solid content amounts.
*2: Self-dispersible yellow pigment, produced by Cabot Corporation, numerals in the table indicate pigment solid content amounts.
*3: Self-dispersible cyan pigment, produced by Cabot Corporation, numerals in the table indicate pigment solid content amounts.
*4: Surfactant represented by the general formula (1) (methyltaurate), produced by Lion Corporation, numerals in the table indicate active ingredient amounts.
*6: Anionic surfactant, produced by Kao Corporation, numerals in the table indicate active ingredient amounts.
*7: Anionic surfactant, produced by Kao Corporation, numerals in the table indicate active ingredient amounts.
*8: Nonionic surfactant, produced by Kao Corporation, numerals in the table indicate active ingredient amounts.
*9: Nonionic surfactant, produced by Kao Corporation, numerals in the table indicate active ingredient amounts.
*10: Silicon-based surfactant, produced by BYK Chemie Japan, KK, numerals in the table indicate active ingredient amounts.
*11: Silicon-based surfactant, produced by BYK Chemie Japan KK, numerals in the table indicate active ingredient amounts.
*12: Unable to be prepared as an ink As shown in TABLE 2, the result of the chromaticness evaluation and the result of the evaluation of re-dispersion property were both satisfactory in Examples 1-21. As shown in FIG. 2, in the water-based inks of Examples 1-21, the 1,2-alkanediol and the surfactant represented by the general formula (1) satisfied the above-described conditions (A) to (C). Further, as shown in FIG. 3, among the water-based inks of Examples 1-5, 9-18 and 21 each using 1,2-hexiandiol or 1,2-pentanediol as the 1,2-alkanediol, Examples 4, 10, 12, 13, 15 and 16 in each of which used the 1,2-hexiandiol or 1,2-pentanediol used as the 1,2-alkanediol and used the surfactant represented by the general formula (1) were blended so as to satisfy the conditions (D) to (F) as described above had highly satisfactory results in both of the result of the chromaticness evaluation and the result of the evaluation of re-dispersion property.

On the other hand, as shown in TABLE 3, the result of the evaluation of re-dispersion property was unsatisfactory in Comparative Examples 1, 3 and 4 in each of which the surfactant represented by the general formula (1) was not used. Further, in Comparative Example 2 in which the 1,2-alkanediol was not used, undissolved matter was generated, which in turn made it impossible to prepare a water-based ink, and thus it was impossible to perform any evaluations of the chromaticness and re-dispersion property. Furthermore, in Comparative Example 5 in which 1,5-pentanediol was used, instead of using the 1,2-alkanediol, the result of evaluation of chromaticness was unsatisfactory. Moreover, in Comparative Examples 6-8, 10 and 11 in each of which used a surfactant that was different from the surfactant represented by the general formula (1), instead of using the surfactant represented by the general formula (1), the results of evaluation of chromaticness and evaluation of re-dispersion property were unsatisfactory. Further, the results of re-dispersion property was quite unsatisfactory in Comparative Example 9 also using a surfactant that was different from the surfactant represented by the general formula (1).

As described above, the water-based ink of the present teaching is capable of improving the re-dispersion stability, without lowering the chromaticness. The usage of the water-based ink of the present teaching is not particularly limited, and the water-based ink of the present teaching is widely applicable to a variety of kinds of ink-jet recording.

What is claimed is:

1. A water-based ink for ink-jet recording comprising:
   a pigment;
   water;
   1,2-alkanediol; and
   a surfactant represented by the following general formula (1):

$$R^1CON(CH_3)CH_2CH_2R^2 \quad (1)$$

wherein in the general formula (1), $R^1$ is a saturated or unsaturated hydrocarbon group having 11 carbon atoms; the hydrocarbon group is a straight-chain or branched-chain hydrocarbon group; $R^2$ is COOM; and M is Li, Na or K.

2. The water-based ink for ink-jet recording according to claim 1, wherein the pigment is a chromatic color pigment.

3. The water-based ink for ink-jet recording according to claim 2, wherein the pigment is at least one selected from the group consisting of a yellow pigment, a magenta pigment and a cyan pigment.

4. The water-based ink for ink-jet recording according to claim 1, wherein the 1,2-alkanediol is a straight-chain alkanediol.

5. The water-based ink for ink-jet recording according to claim 1, wherein the 1,2-alkanediol has 2 to 6 carbon atoms.

6. The water-based ink for ink-jet recording according to claim 1, wherein the 1,2-alkanediol is at least one selected from the group consisting of 1,2-ethanediol, 1,2-propanediol, 1,2-butanediol, 1,2-pentanediol, and 1,2-hexanediol.

7. The water-based ink for ink-jet recording according to claim 1, wherein the 1,2-alkanediol is at least one of 1,2-pentanediol and 1,2-hexanediol.

8. The water-based ink for ink-jet recording according to claim 1, wherein the 1,2-alkanediol is 1,2-hexanediol.

9. The water-based ink for ink-jet recording according to claim 1, wherein a blending amount (x % by weight) of the 1,2-alkanediol in the water-based ink and a blending amount (y % by weight) of the surfactant represented by the general formula (1) in the water-based ink satisfy the following conditions (A) to (C):

$$5 \leq x \leq 30 \quad (A)$$

$$0.1 \leq y \leq 1 \quad (B)$$

$$y \geq -0.05x + 0.75. \quad (C)$$

10. The water-based ink for ink-jet recording according to claim 1, wherein the 1,2-alkanediol is at least one of 1,2-hexanediol and 1,2-pentanediol; and a blending amount (x % by weight) of the 1,2-alkanediol in the water-based ink and a blending amount (y % by weight) of the surfactant represented by the general formula (1) in the water-based ink satisfy the following conditions (D) to (F):

$$5 \leq x \leq 25 \quad (D)$$

$$0.3 \leq y \leq 1 \quad (E)$$

$$y \geq -0.05x + 1.25. \quad (F)$$

11. The water-based ink for ink-jet recording according to claim 1, wherein the surfactant represented by the general formula (1) is contained by 50% by weight to 100% by weight with respect to a total amount of surfactants contained in the water-based ink.

12. An ink cartridge comprising the water-based ink for ink-jet recording as defined in claim 1.

13. An ink-jet recording apparatus comprising:
the water-based ink for ink-jet recording as defined in claim 1;
an ink accommodating section configured to accommodate the water-based ink; and
an ink discharge mechanism configured to discharge the ink accommodated in the ink accommodating section.

14. A water-based ink for ink-jet recording comprising:
a pigment;
water;
1,2-alkanediol; and
a surfactant represented by the following general formula (1):

$$R^1CON(CH_3)CH_2CH_2R^2 \quad (1)$$

wherein in the general formula (1), $R^1$ is a saturated or unsaturated hydrocarbon group having 9 to 19 carbon atoms; the hydrocarbon group is a straight-chain or branched-chain hydrocarbon group; $R^2$ is $SO_3M$ or COOM; and M is Li, Na or K, wherein the surfactant represented by the general formula (1) is contained by 50% by weight to 100% by weight with respect to a total amount of surfactants contained in the water-based ink.

15. The water-based ink for ink-jet recording according to claim 14, wherein the 1,2-alkanediol is a straight-chain alkanediol.

16. The water-based ink for ink-jet recording according to claim 14, wherein the 1,2-alkanediol has 2 to 6 carbon atoms.

17. The water-based ink for ink-jet recording according to claim 14, wherein the 1,2-alkanediol is at least one selected from the group consisting of 1,2-ethanediol, 1,2-propanediol, 1,2-butanediol, 1,2-pentanediol, and 1,2-hexanediol.

18. The water-based ink for ink-jet recording according to claim 14, wherein the surfactant represented by the general formula (1) is at least one of methyltaurate and alaninate.

* * * * *